United States Patent

[11] 3,627,590

[72] Inventor Walter Kester Mammel
Yardley, Pa.
[21] Appl. No. 780,481
[22] Filed Dec. 2, 1968
[45] Patented Dec. 14, 1971
[73] Assignee Western Electric Company, Incorporated
New York, N.Y.

[54] METHOD FOR HEAT TREATMENT OF WORKPIECES
33 Claims, 6 Drawing Figs.

[52] U.S. Cl. .......... 148/1.5, 117/106 A, 148/13, 148/20.3, 148/174, 148/175, 148/186, 148/189
[51] Int. Cl. .......... H01l 7/34
[50] Field of Search .......... 148/1.5, 174, 175, 180, 186, 189, 13, 20.3, 4; 117/106, 107, 107.2, 200, 201

[56] References Cited
UNITED STATES PATENTS

| | | | |
|---|---|---|---|
| 1,948,173 | 2/1934 | Hagan | 148/13 |
| 3,293,074 | 12/1966 | Nickl | 148/1.5 |

*Primary Examiner*—Richard O. Dean
*Attorneys*—H. J. Winegar, R. P. Miller and W. M. Kain

ABSTRACT: A workpiece, for example a semiconductor slice, is floated on a layer of gas and heated by infrared radiation. The layer of gas thermally insulates the workpiece from adjacent, thermally-conductive bodies so that the temperature of the workpiece is rapidly increased. Upon the subsequent removal of the radiation, the workpiece rapidly cools to the ambient temperature. In addition to supporting the workpiece, the layer of gas prevents physical contact between the workpiece and the flotation apparatus, thus ensuring even heating of the workpiece. The gas used to float the workpiece may be inert or it may include chemicals to react with the workpiece to modify the electrical or physical characteristics thereof. In applications where thermal insulation of the workpiece is less significant, the workpiece is placed upon a flat susceptor positioned a predetermined distance from one focus of an ellipsoidal furnace. The direct heating of the upper surface of the workpiece by the infrared source is supplemented by indirect heating of the bottom surface of the slice by conduction from the susceptor which is itself heated by the reflected infrared radiation which strikes the rear surface of the susceptor. The combined effect of the direct and indirect heating of the workpiece results in a very even heating thereof.

INVENTOR
W. K. MAMMEL
BY B.W. Sheffield
ATTORNEY

METHOD FOR HEAT TREATMENT OF WORKPIECES

BACKGROUND OF THE INVENTION

1. Field of the Invention

This invention relates to methods and apparatus for the heat treatment of workpieces and is especially useful in the heat treatment of semiconductor slices to alter their electrical or physical characteristics.

2. Description of the Prior Art

In the fabrication of semiconductor devices, such as transistors, thin circular slices of semiconductor material are subjected to heat treatment to alter their electrical or physical characteristics. For example, heat treatment is involved in epitaxial layer deposition, impurity diffusion and gold spiking.

In epitaxial deposition, the semiconductor slice is heated in a gaseous atmosphere which contains the material to be deposited as the epitaxial layer. The reaction between the heated slice and the gas forms an epitaxial layer on the surface of the slice. Similarly, in impurity diffusion, the semiconductor slice is heated in an impurity-containing gas and the impurities contained in the gas diffuse into the semiconductor slice. In gold spiking, a semiconductor slice, which has previously been diffused with gold atom impurities at a lower temperature, is subjected to a relatively rapid heating and quenching cycle at a higher temperature to randomly distribute the gold impurities throughout the slice.

The thin slices of semiconductor material are, of course, extremely fragile and must be handled with great delicacy during the various heat treatment operations. Scrupulous cleanliness must also be observed to prevent contamination of the slices. More importantly, however, the heat treatment itself must be uniform throughout each slice in order that the several hundred semiconductor devices, which are ultimately fabricated from each slice, will all exhibit substantially the same electrical parameters.

Gold spiking of semiconductor slices is presently accomplished by supporting the treated slice on a quartz paddle and inserting the paddle into a furnace, for example a radiant energy furnace. After a predetermined interval, the paddle is removed and the slice permitted to cool briefly while still resting on the quartz paddle. The slice is then quickly flipped onto a wire mesh by a blast of air to complete the quenching operation.

With these prior art gold spiking procedures a problem arises because the quartz paddle has considerably greater mass and thermal inertia than the semiconductor slice. The intimate physical contact between the semiconductor slice and the supporting quartz paddle limits the rate at which the slice may be heated and cooled, to the detriment of the spiking process. Another problem with prior art gold spiking procedures is that the air blast required to transfer the slice onto the quenching metal screen tends to physically damage the slice and, if there are any impurities present on the quenching screen, to contaminate the slice. Yet another problem in the prior art arises when either the quartz paddle or the semiconductor slice is warped, since the slice will make imperfect contact with the boat resulting in uneven heating of the slice and thus uneven distribution of the gold impurities therein.

Epitaxial layer deposition is presently accomplished by placing the semiconductor slice on a susceptor, inserting the susceptor and slice into a quartz enclosure which contains the gaseous atmosphere which is to react with the slice, heating the susceptor with an induction coil, and thereby heating the slice by conduction from the susceptor.

Warpage of the semiconductor slice and/or the susceptor is as much of a problem in epitaxial deposition as it is in the previously discussed gold spiking; however, an additional and more serious problem has been noticed with prior art epitaxial growth techniques. This processing problem is the so-called "levitation" of the slice wherein the slice intermittently "dances" above the surface of the susceptor. The exact mechanism by which this "levitation" occurs is not known, but it is believed to be the result of a reaction between the strong magnetic field generated by the induction coil and the hot ionized gases surrounding the slice.

In any event, the intermittent lack of physical contact between the slice and the susceptor produces an uneven heating of the slice. This uneven heating results in the same uneven processing which occurs during a spiking process when either the slice or the susceptor is warped. Attempts to avoid this problem, by substituting radiant energy heating for the induction heating heretofore used, have not proven completely satisfactory because, in order to obtain the high temperatures required for epitaxial deposition and impurity diffusion, the radiant energy must be focused onto the slice. This focusing, in turn, introduces yet another problem, namely an uneven temperature profile over the surface of the slice.

SUMMARY OF THE INVENTION

The general object of this invention is to overcome deficiencies in the prior art techniques for heat treatment of workpieces.

With this and other objects in mind, one illustrative embodiment of the invention contemplates apparatus and methods for heat treating a semiconductor which involves floating the slice on a layer of fluid and heating the slice with a source of radiant energy.

The flotation of the slice upon the layer of fluid thermally insulates the slice from adjacent, thermally conductive bodies so that the thermal inertia of the slice alone determines the time required to heat and cool the slice. This is in contrast to the prior art where the combined thermal inertia of the slice and the slice-support are the determining factors which act to limit the rate at which the slice may be heated and cooled. This first, illustrative, embodiment of the invention likewise eliminates uneven heating of the slice caused by warpage of either the slice or the slice-support. The thermal insulation of the slice is accompanied, of course, by a concomitant physical isolation so that all parts of the semiconductor slice are heated to the same temperature. Again, this is in contrast with the prior art where, if the slice is warped, only certain portions thereof contact the surface of the support, so that there is an uneven heating of the slice at those contacting portions. Needless to say, the cushioning effect of the layer of fluid greatly reduces the possibility of physical damage to, and contamination of, the semiconductor slice.

Another illustrative embodiment of the invention contemplates apparatus and methods for heat treating a semiconductor slice which involves means for supporting the semiconductor slice on a susceptor placed close to one focus of an ellipsoidal reflector and means for heating the slice with a radiant energy source placed at the other focus of the reflector. The focused energy falling onto the surface of the slice tends to heat the slice unevenly, as in the prior art, but that portion of the radiant energy which is not intercepted by the slice and the susceptor is reflected off the rear surface of the reflector to heat the back surface of the susceptor. The heated susceptor, in turn, heats the back surface of the slice by thermal conduction and the combined heating effect of the direct radiation at the front surface of the slice and the indirect radiation to the rear surface of the slice results in a very even temperature profile across the slice. This second embodiment of the invention also contemplates displacing the susceptor and slice a predetermined distance from the focus of the reflector to further defocus the image of the radiant energy source falling onto the slice, thus producing an even more uniform heating of the slice. Thus, this second, illustrative, embodiment solves both the "levitation" problem of the prior art as well as the uneven temperature profile normally associated with the use of focused radiant energy.

DETAILED DESCRIPTION

Figure 1:
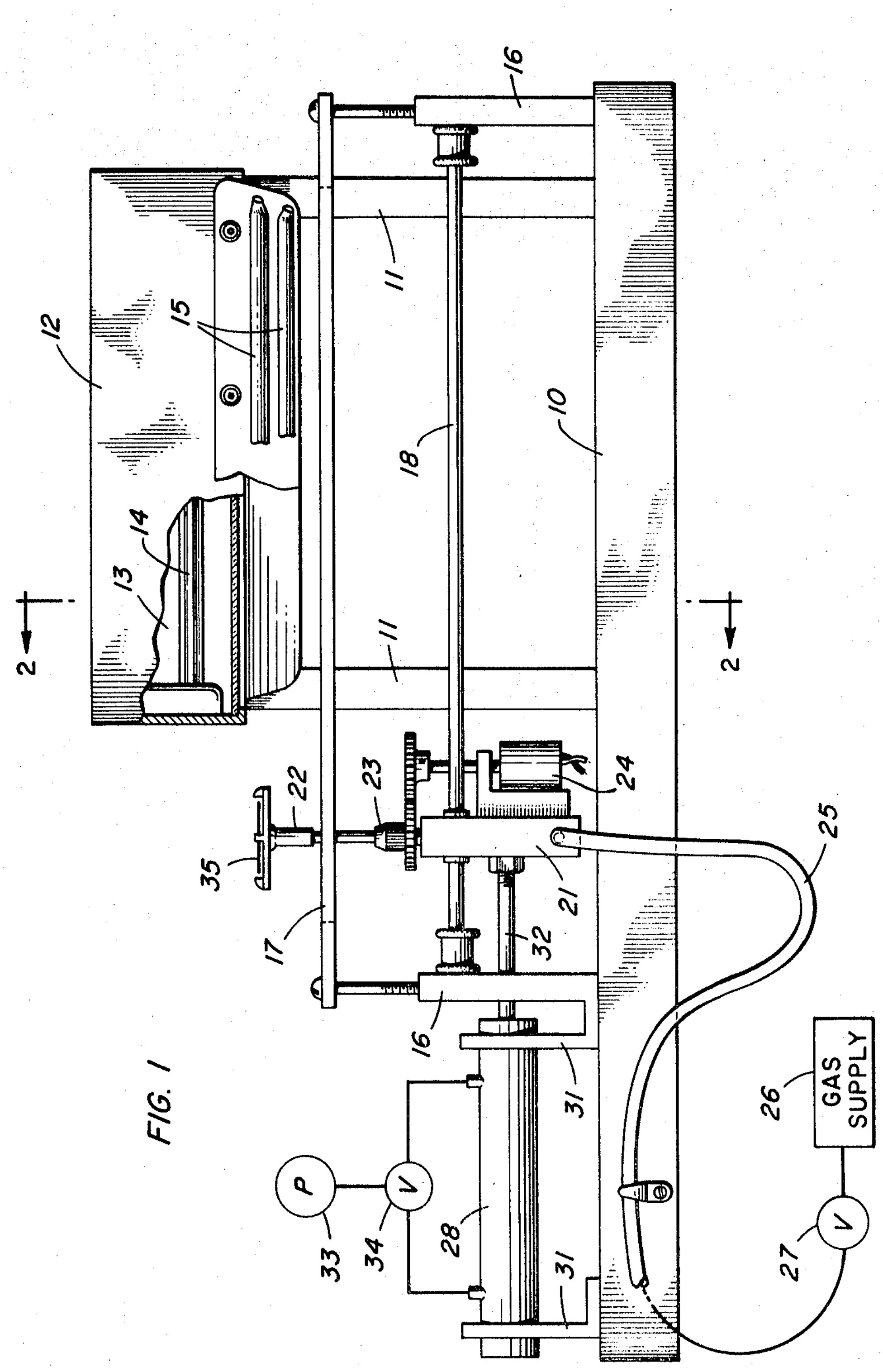
FIG. 1 is a side-elevational view of a heat-treating apparatus according to the principles of this invention which illustrates facilities for floating a workpiece on a layer of gas and for passing the workpiece beneath a radiant heater.
Figure 2:
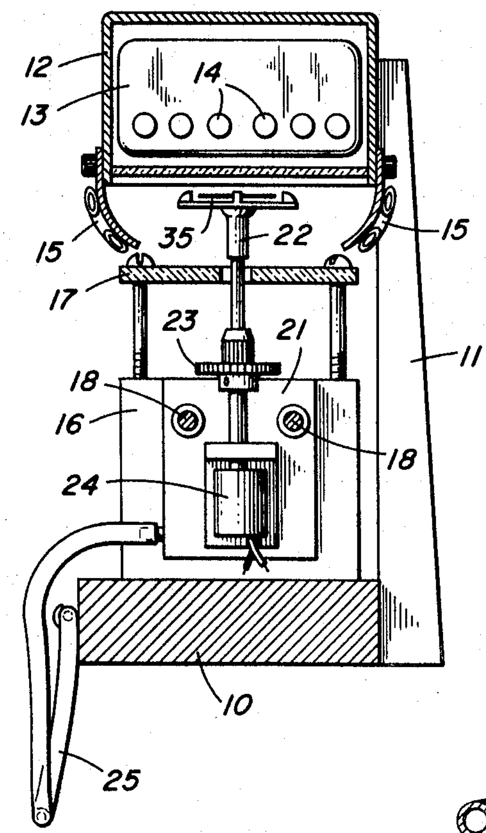
PRIOR ART FIG. 2
FIG. 2 is a cross-sectional view, taken on section 2—2 of the apparatus shown in FIG. 1 and which more fully illustrates the manner in which the workpiece is supported and passed beneath the radiant heater.

FIGS. 1 and 2 illustrate an embodiment of the invention which may be advantageously used for the spiking of semiconductor slices, for example, silicon semiconductor slices into which gold atom impurities have previously been diffused. The apparatus comprises a base 10 and a pair of upwardly extending supports 11 fastened to the base for supporting a radiant energy heater 12 above the base 10. The heater 12 comprises a reflector 13 and a plurality of quartz lamps 14. A plurality of cooling water pipes 15 surround the lower surface of the heater 12 to maintain the surface thereof at a safe temperature. A pair of upwardly extending bifurcated supports 16 retain a slotted guideway 17 intermediate the surface of base 10 and heater 12. A pair of rods 18 are connected between the respective tines of the bifurcated supports 16. A carriage 21 is slidably mounted on the rods 18 so that the carriage may be advanced beneath heater 12. A pickup device 22, for example the pressurized fluid pickup device disclosed in my copending application Ser. No. 485,751 filed on Sept. 8, 1965, now U.S. Pat. No. 3,466,079 is mounted upon carriage 21. Advantageously pickup device 22 is rotatably mounted on carriage 21. In that event a gear mechanism 23 is affixed to the lower end of pickup device 22 and is driven by the shaft of an electrical motor 24 mounted within carriage 21. When energized, the motor 24 will rotate pickup device 22 at some suitable speed, for example 20 r.p.m., to permit more even heating of any workpiece placed thereon. A flexible hose 25 connects a supply of gas, for example a gas such as nitrogen, which is relatively inert with respect to silicon and gold, from a source 26 to pickup device 22. A regulating valve 27 regulates the pressure of the gas supplied by source 26. An air cylinder 28 mounted on base 10 by a pair of supports 31 is connected via a piston rod 32 to carriage 21 to move the carriage along rods 18 and position pickup device 22 below radiant energy heater 12. A source of pressurized air 33 and a control valve 34 control the forward or backward motion of piston rod 32 within cylinder 28.

In operation for a spiking procedure, valve 27 is opened to permit gas to flow to pickup device 22 and a workpiece, for example, a slice of semiconductor material 35, is placed upon pickup device 22. The gas from source 26 floats semiconductor slice 35 above the surface of support 22, in a manner more fully explained in my above referenced copending application.

The quartz lamps 14 and electrical motor 24 are then activated. After the lamps 14 have reached the temperature at which satisfactory spiking will take place, valve 34 is opened to advance carriage 21 along rods 18 so that pickup device 22 and semiconductor slice 35 are positioned beneath heater 12. Because the semiconductor slice is floating upon a layer of gas, the slice is removed from physical contact with support 22 and is, thus, effectively thermally insulated therefrom. It should be noted that although the semiconductor slice is floating on a layer of gas, the viscous drag between the slice and the gas, together with intermittent contact between the edge of the slice and the inner walls of pickup device 22, cause the slice to rotate with the pickup device as motor 24 rotates gear mechanism 23. The only significant thermal inertia which affects the time required for slice 35 to rise to the desired spiking temperature is the thermal inertia of the slice itself.

After the desired time interval, valve 34 is reversed to retract carriage 21 from beneath heater 12 and slice 35 is permitted to cool. The thermal insulation of slice 35 facilitates the rapid cooling thereof as the slice itself has a relatively low-thermal inertia and is removed from physical contact with the now heated pickup device 22. As previously mentioned, gas from supply 26 tends to cool slice 35 and during this stage of the process valve 27 may be further opened to increase the flow of gas to pickup device 22 to decrease the time required to quench slice 35.

The gas from supply 26 which is used to support the semiconductor slice may comprise one of the truly inert gases, such as argon, neon, etc. or a gas which is relatively inert with respect to the semiconductor slice, such as nitrogen. In addition to supporting the semiconductor slice, the stream of pressurized gas may also perform other desirable functions such as cleaning the surface of the slice or protecting the slice from harmful chemicals or dirt. Further the gas may be chosen so that it reacts chemically with the slice, or chemicals may be introduced into an otherwise inert gas to modify the electrical and chemical characteristics of the slice before, during, and after the heating step. In the event that the gas from source 26 is not chemically inert with respect to the silicon slice and contains chemicals to react with the heated slice 35, any of several known means may be used to vent the spent gases after they have passed over the surface of the slice 35.

The apparatus shown in FIGS. 1 and 2 of the drawing has been experimentally used in the manufacture of high-speed diffused silicon planar epitaxial transistors. More particularly, it has been used in a gold spiking process to reduce the storage time of the epitaxial transistors. A silicon slice 1¼ inches in diameter and 7 mils thick, which had been previously diffused at a lower temperature with gold atom impurities, was placed on a quartz pressurized fluid pickup device of the type disclosed in my referenced copending application. The pickup device was 1½ inches in diameter and had a ¼-inch diameter hole centrally located therein. Inert nitrogen gas, at a pressure of 3/16-inch water column, was applied to the pickup device to float the slice above the surface thereof. The radiant energy heater comprised six 2,000-watt quartz lamps and the voltage thereto was adjusted so that the power drawn by the lamps was approximately 8,350 watts. The pressurized pickup device and the slice were advanced beneath the radiant energy lamp. In this position the surface of the slice was about 2 inches from the radiant energy lamps. The slice rapidly attained a temperature of 1,060° C. and after an interval of 5 seconds, the pickup device and slice were removed from beneath the radiant energy heater and permitted to cool. When the electrical characteristics of the slice were tested, the storage time thereof was found to be considerably improved and in the order of 2 to 3 nanoseconds. The evenness of the spiking was also found to be excellent. This is due to the very even temperature profile obtainable with the apparatus of FIGS. 1 and 2. This even temperature profile has been verified by the use of temperature-sensitive paint coated over the surface of a slice during a representative spiking process. One factor contributing to the improved storage time cf slices which have been spiked using the apparatus of FIGS. 1 and 2 is believed to be the freedom from contamination obtainable by the use of this apparatus.

Figure 3A:
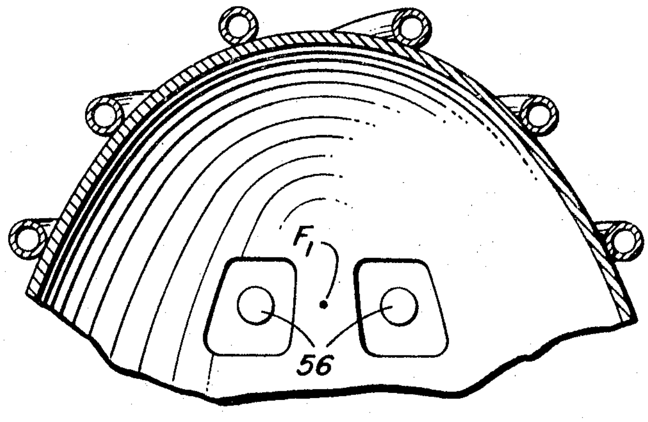
FIG. 3A is a cross-sectional view of a portion of the apparatus shown in FIG. 3 and illustrates an alternative arrangement of the radiant energy heating lamps therein.
Figure 3:
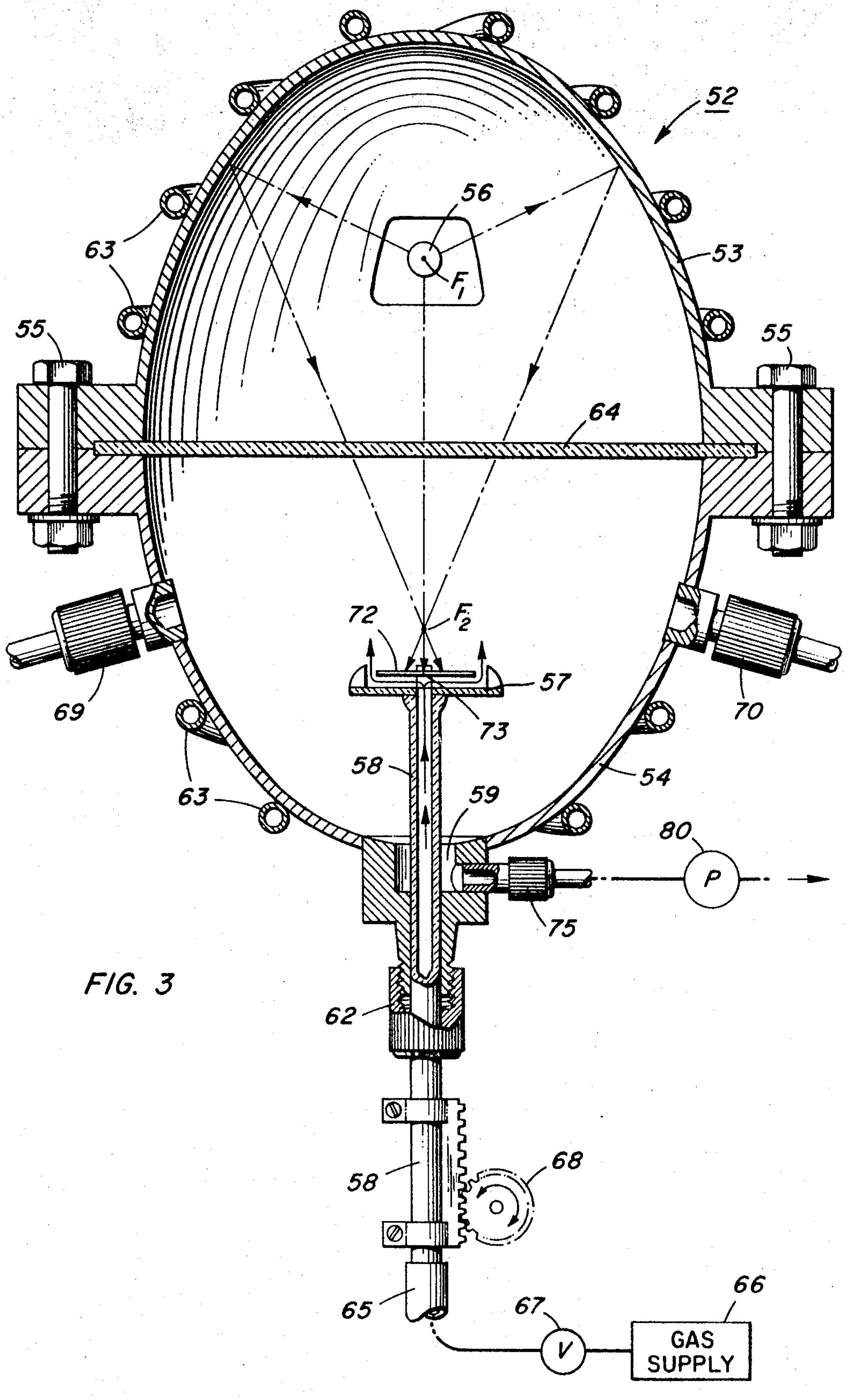
FIG. 3 is a cross-sectional view of an alternative, illustrative, embodiment of the invention which uses focused radiant energy heating in lieu of the radiant heater used in the other illustrative embodiments.

Referring now to FIG. 3, there is shown an alternative embodiment of the invention which may also be used for gold spiking but which is more advantageously used for epitaxial layer deposition in which, for example, silane gas is used to deposit an epitaxial layer of silicon on a silicon slice, and for impurity diffusion in which, for example, phosphorous impurities are diffused into a silicon slice to alter the electrical characteristics thereof.

The apparatus of FIG. 3 comprises an ellipsoidal reflector 52 having an upper section 53 and a lower section 54 which are joined at the central position thereof by screw-fastening means 55.

A flat, transparent, quartz plate 64 is positioned intermediate and preferably equidistant, from the first and second foci $F_1$ and $F_2$ of reflector 52 to hermetically seal the lower half of the reflector from the atmosphere. A source of radiant energy 56, for example, a quartz lamp, is located at one focus $F_1$ of the reflector 52 and a pressurized fluid pickup device 57 is located in the vicinity of the other focus $F_2$ thereof.

In epitaxial layer deposition, as in virtually all semiconductor processing steps, it is essential that the silicon slice remain uncontaminated, for a contaminated slice results in semiconductor devices which are unstable in their operation or which fail to meet their designed specifications. The use of a pressurized fluid pickup device greatly reduces the possibility of contamination of the slice caused by physical contact with the slice support.

The hollow lower end 58 of the pickup device 57 passes through an aperture 59 in the lower end 54 of the reflector 52 and is secured from movement by a threaded lockscrew 62. The upper and lower portions 53 and 54 of the reflector are surrounded by a plurality of cooling water pipes 63 to maintain the temperature of the surface of the reflector to a safe level.

The downwardly extending portion 58 of pressurized pickup device 57 is connected by a flexible hose 65 to a pressurized source of gas 66, for example, hydrogen, which is used to support the semiconductor slice. A valve 67 is connected in the hose to regulate the flow of gas from source 66.

A gear 68 engages downwardly extending portion 58 of pickup device 57 to move the device 57 up or down within the lower half 54 of reflector 52 whenever lockscrew 62 is released.

First and second nipples 69 and 70 are connected to the lower portion 54 of reflector 52 for the introduction of the gas, for example, a mixture of silane ($SiH_4$) and hydrogen ($H_2$), which is to deposit the epitaxial silicon layer on the slice. A third nozzle 75 is connected to the lower end of reflector 52 for the exhaustion of spent gases therefrom, for example, the hydrogen used to support the slice and the silane and hydrogen used to deposit the epitaxial layer.

As previously discussed, the gas used to support the slice, may also be the gas used to create the epitaxial silicon layer. In that event gas source 66 will supply only silane and hydrogen and nozzles 69 and 70 will not be used. If desired, however, nozzles 69 and 70 may be connected in tandem with nozzle 75 to increase the rate at which spent silane and hydrogen is exhausted.

In an epitaxial layer deposition operation, valve 67 is opened to supply pressurized hydrogen gas to pickup device 57 and a slice of silicon semiconductor material 72 placed upon pickup device 57 while the lower portion 54 of reflector 52 is separated from the upper portion 53 thereof. Slice 72 is thus floated above the surface of the pickup device.

The upper and lower portions of reflector 52 are then fastened together by means of screws 55. When so fastened quartz plate 64 is firmly pressed against the lower half of reflector 52 to seal it from the outer atmosphere. The upper half of reflector 52 is, however, open to the atmosphere to improve cooling thereof. The threaded lockscrew 62 is unscrewed to facilitate movement of pickup device 57 within reflector 52 and gear 68 rotated until the upper surface of the slice 72 is positioned near, but slightly apart from the second focus $F_2$ of ellipsoidal reflector 52. A source of silane and hydrogen to deposit the epitaxial layer on slice 72, is then connected to nipples 69 and 70 so that the lower portion 54 of reflector 52 becomes filled therewith. An exhaust pump 80 is connected to nipple 75 so that a constant stream of fresh silane and hydrogen may be passed over the surface of the slice. The radiant energy lamp 56 is then energized to heat the surface of the slice and begin the epitaxial deposition. In the alternative, the source of silane and hydrogen gas which is to grow the epitaxial layer on the slice 72 may be introduced in, or indeed be substituted for, the source of hydrogen gas from source 66 which is used to support slice 72 above pickup device 57. This alternative procedure also has the advantage that an epitaxial layer may be grown on both surfaces of the semiconductor slice if this should be desired.

With semiconductor slice 72 positioned a slight distance from focus $F_2$ of reflector 52 there will be a tendency for the central position 73 of slice 72 to be heated to a greater extend than the outermost portions thereof. This is because the ellipsoidal reflector 52 tends to focus a real image of the filament of quartz lamp 56 onto the slice face resulting in an extreme temperature gradient thereon. This extreme temperature gradient, of course, results in uneven heating of the slice. Because of the large amounts of heat necessary to produce a satisfactory epitaxial layer it has been found advantageous, in some applications, to use a pair of quartz lamps 56 mounted side by side as shown in FIG. 3A. This arrangement has the added benefit that while the effective center of the heat source thus created remains at focus $F_1$ the overall filament area is increased reducing the temperature gradient at the surface of the slice. For many applications, however, the reduced temperature gradient still remains intolerably high and must be reduced still further.

It has been discovered that this uneven heating may be compensated for by adjusting valve 67 to increase the flow of gas from source 66 above the minimum value necessary to float the slice 72 above the surface of pickup device 57. The gas now tends to cool the lower surface of the slice and more particularly the central portion 73 thereof. The concentrated heating caused by the focused image of the quartz lamp filament or filaments, and the cooling effect caused by the increased flow of supporting gas will tend to cancel each other out so that an even temperature profile is attained across the surface of the slice. In most semiconductor processing applications, including epitaxial deposition, it is desirable to have an extremely even temperature profile across the surface of the slice. In that case, the image of the lamp filament or filaments may be defocused, in a controlled manner, by rotating the gear 68 to displace pickup device 57 from the second focus $F_2$ of ellipsoidal reflector 52 so that the image of the filament or filaments of the radiant energy lamp 56 falling upon the surface of slice 72 becomes less distinct. This controlled defocusing lessens the tendency to overheat the central portion 73 of the semiconductor slice 72. This displacement may be in front of or behind the second focus $F_2$.

In some processing applications there is a tendency for the gas which reacts with the slice to be deposited on any heated surface within the reflector. In the illustrative epitaxial layer deposition, for example, the silane gas ($SiH_4$) used to grow the epitaxial layer exhibits this tendency. Were it not for quartz plate 64 the silane gas which reacts with semiconductor slice 72 would tend to deposit itself on the surface of radiant energy lamp 56, thus steadily decreasing the light output therefrom during the heat treatment of the semiconductor slice. To minimize this effect quartz plate 64 is positioned intermediate the first and second foci $F_1$ and $F_2$ of reflector 52. Preferably the plate 64 is located equidistant the two foci. In this midpoint position, the concentration of radiant energy from the radiant energy lamp 56 is at a minimum and deposition on the surface of the quartz plate is likewise minimized.

After a suitable time has elapsed, radiant energy source 56 is disconnected and screws 55 removed to separate the upper and lower halves of reflector 52. Slice 72 is then removed for further processing and valve 67 closed to halt the flow of supporting gas to pickup device 57.

If the apparatus shown in FIG. 3 were to be used in an epitaxial layer deposition process and a silicon slice 1¼ inch in diameter and 7 mils thick placed on a quartz pickup device positioned within the lower half of the ellipsoidal reflector and supported above the pickup device by means of a mixture of hydrogen and silane gas ($SiH_4$) at a pressure of 1 atmosphere, available data indicates that highly satisfactory epitaxial deposition would be achieved. It is assumed that after the upper and lower halves of the ellipsoidal reflector are closed, controlled defocusing is obtained by moving the quartz pickup device 0.15 inches away from the second focus $F_2$. If a quartz lamp is positioned at focus $F_1$ of the ellipsoidal reflector and energized to raise the temperature of the slice to 1,150° C. the temperature variation across the surface of the slice will be very small. A typical processing time of 10 minutes will produce a very uniform epitaxial layer of silicon on the slice. As was the case with the gold spiking operation previously discussed, the processed slice would be free from contamination and physical damage.

Figure 4:
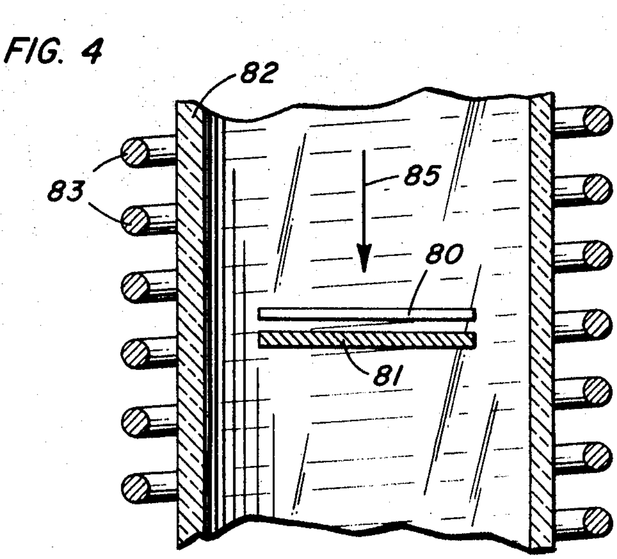
FIG. 4 is a cross-sectional view of a prior art apparatus for the heat treatment of a semiconductor slice and which has been found to result in the uneven heating thereof.

FIG. 4 of the drawing illustrates a prior art apparatus for epitaxial layer growth of a semiconductor slice. In the prior art, the slice 80 is placed in contact with a metal susceptor 81 and supported within a cylindrical quartz tube 82. An induction coil 83 surrounds the tube 82 and, when energized by a suitable AC source, induced eddy currents within susceptor 81 raise the temperature thereof. The semiconductor slice 80 is heated by conduction from susceptor 81 and a gas 85 passed down through tube 82 and over heated slice 80 to react thereon. As previously discussed, a tendency is noticed in the prior art for the slice 80 to "levitate" or "dance" above the surface of the susceptor 81, resulting in uneven heating of the slice. This "levitation" is believed to be caused, in part, by the strong magnetic fields generated by the induction heating coil 83.

Figure 5:
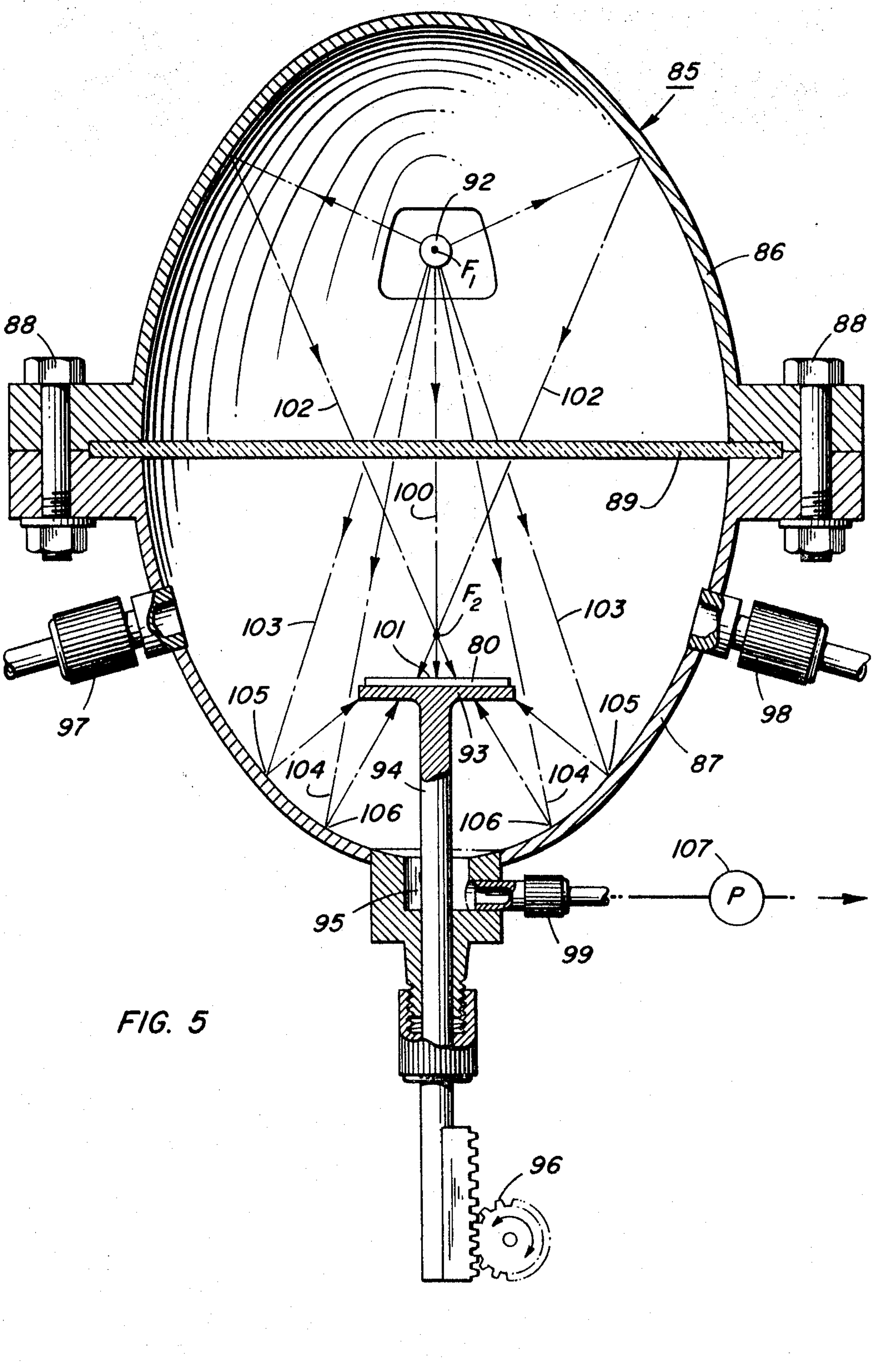
FIG. 5 is a cross-sectional view of another alternative, illustrative, embodiment of the invention which uses defocused radiant energy heating and wherein the workpiece is supported by physical contact with a susceptor.

FIG. 5 of the drawing shows another, illustrative, embodiment of the invention which eliminates this "levitation" problem. An ellipsoidal reflector 85 is divided into upper and lower portions 86 and 87 which are secured together at the central portion thereof by screws 88. A quartz plate 89 separates the upper and lower portions of the reflector 85 in the same manner as previously described in connection with FIG. 3. A quartz lamp 92 is positioned at the first focus $F_1$ of ellipsoidal reflector 85 and a metal susceptor 93 positioned near the second focus $F_2$ thereof.

A rod 94 is connected to the central portion of the susceptor and is slidably mounted within an aperture 95 in the lower portion 87 of reflector 85. A gear 96 engages rod 94 to move the susceptor within the reflector 85. First and second nipples 97 and 98 are connected through the lower half 87 of reflector 85 to introduce the gas which is to react on semiconductor slice 80 on susceptor 93 to produce an epitaxial layer thereon. A third nipple 99 is connected to the lower portion 87 of reflector 85 for the exhaustion of spent gases.

Referring to the drawing, an illustrative heat ray 100 passes directly from lamp 92 and strikes the central portion 101 of semiconductor slice 80, while illustrative rays 102 are reflected from the sidewalls of ellipsoidal reflector 85 and, after converging with the direct ray 100 at the second focus $F_2$ of reflector 85, the rays 102 continue on to strike the central portion 101 of slice 80. The combined effect of the direct ray 100 and the reflected rays 102 is to heat the central portion 101 of slice 80 to a high temperature. The rays 100 and 102, are, of course, merely illustrative of the plurality of rays which eminate from lamp 92 and pass through the second focus $F_2$. Because lamp 92 has a finite volume it does not act as a true point source, thus, there will be some radiant energy falling on those portions of slice 80 other than the central portion 101. However, practically speaking, a far greater percentage of the energy will fall upon the central portion 101 of slice 80. Some rays from lamp 92, however, will not be intercepted by susceptor 93 and slice 80 and will be reflected from the rear surface of reflector 85 to impinge upon the rear surface of susceptor 93. For example, rays 103 and 104 are reflected off the rear surface of reflector 85 at positions 105 and 106, respectively, and impinge upon the lower surface of susceptor 93 at the outermost portions thereof. The radiant energy striking the lower surface of susceptor 93 heats the susceptor and, by conduction, indirectly heats semiconductor slice 80. The concentrated direct radiation at center 101 of slice 80 is supplemented by the indirect heating from the rear of susceptor 93 so that an extremely even temperature profile is obtained over the surface of the slice.

As previously discussed with reference to lamps 56 in FIG. 3, it is possible to substitute two lamps 92 for the single lamp 92 shown in FIG. 5. Although this tends to diminish the extent of the problem the supplemental heating at the rear of susceptor 93 is still most advantageous. In addition, the gear 96 may be rotated to displace the susceptor from the second focus $F_2$ of reflector 85 to soften the image of the filament or filaments of lamp 92 falling upon slice 80 by controlled defocusing of the image, as discussed in connection with FIG. 3. If the upper and lower portions 86 and 87 of ellipsoidal reflector 85 are transparent or have a transparent window mounted therein, the distance by which the susceptor must be displaced to produce an even temperature gradient across the surface of the slice may be determined, in a calibration step prior to the actual production run, by visual observation of the image of filament of lamp 92 which appears on the surface of slice 80. Alternatively, temperature-sensitive paint may be coated on the surface of a slice and a series of calibration runs made for each new combination of quartz lamp 92 and semiconductor slice 80 until the optimum displacement for the susceptor is found.

In an impurity diffusion operation, a silicon semiconductor slice 80 is placed on susceptor 93 while the upper and lower halves 86 and 87 of ellipsoidal reflector 85 are still apart. The upper and lower halves are then joined together by screws 88 to seal the lower half 87 from the external atmosphere. Gear 96 is, of course, already rotated to position the susceptor 93 at the desired location within the reflector 85 as determined by a prior calibration run. A phosphorous-containing gas or other conductivity determining impurity to react with slice 80 is introduced through nipples 97 and 98 and exhausted through nipple 99 by means of pump 107 and quartz lamp 92 is energized. After a sufficient time interval has elapsed to ensure the required degree of impurity diffusion within the semiconductor slice, quartz lamp 92 is deenergized and the flow of gas to nipples 97 and 98 discontinued. The screws 88 are removed to separate the upper and the lower halves 86 and 87 of ellipsoidal reflector 85 and slice 80 removed from susceptor 93 for further processing.

If the apparatus disclosed in FIG. 5 were to be used in a diffusion process and a slice of silicon 1¼ inches in diameter and 7 mils thick placed on a quartz susceptor 1½ inches in diameter and five thirty-seconds inches thick, available data indicates that highly satisfactory diffusion would be achieved. In the above mentioned calculations it is assumed that a phosphorous-containing gas is introduced into the ellipsoidal reflector and a quartz infrared lamp placed at the first focus $F_1$ of the reflector 85 and energized to heat the surface of the slice to a temperature of 1,000° C. If the ellipsoidal reflector is dimensioned such that the distance between the first and second foci is 3.54 inches, then on the basis of previous calibration tests, the gear 96 is rotated, prior to the energization of the quartz infrared lamp, so that the upper surface of slice 80 is displaced 0.15 inches from the second focus $F_2$ and 3.69 inches from the first focus $F_1$ of the reflector. If after a period of 30 minutes the quartz lamp 92 is deenergized and the slice, which will now be diffused with phosphorous impurities, removed from the reflector for further processing, the temperature variation across the surface of the slice will be found to be small. As a result of the extremely even temperature profile which may be obtained by this process, the impurities will be found to be uniformly diffused into the slice.

It will be understood that the above-described arrangements of apparatus are merely illustrative of applications of the principles of this invention and many other embodiments and modifications may be made without departing from the spirit and scope of the invention.

What is claimed is:

1. A method of heat treating a workpiece comprising the steps of:

floating said workpiece on a stream of gas;

heating said workpiece by placing the workpiece at one focus of an ellipsoidal reflector having a source of radiant energy at the other focus thereof; and thereafter cooling said workpiece with said stream of gas, the flotation of said workpiece on said stream of gas resulting in the thermal insulation of said workpiece from external, thermally conductive bodies.

2. The method according to claim 1 comprising the further step of:

introducing, into said gas, material to treat said workpiece to modify physical properties thereof.

3. A method of heat treating a slice of semiconductor material, comprising the steps of:

placing said slice of semiconductor material on the upper surface of a susceptor;

positioning said susceptor so that the upper surface of said slice is located at one focus of an ellipsoidal reflector having a radiant energy source at the other focus thereof;

heating the upper surface of said slice directly by radiation from said source, and indirectly by reflection from a first arcuate surface of said reflector; and heating the lower surface of said susceptor with radiant energy from said source reflected from a second arcuate surface of said reflector so that the lower surface of said slice is heated by conduction from said susceptor; the radiant heating of the upper surface of said slice and the conductive heating of the lower surface of said slice cooperating to produce an even temperature gradient across said slice.

4. The method according to claim 3 comprising the further step of:

positioning said susceptor to place the upper surface of said slice a predetermined distance from one focus of an ellipsoidal reflector having said radiant energy source at the other focus thereof, to defocus the image of the radiant energy source falling on the upper surface of said slice so that a more even temperature profile is obtained over the surface of said slice.

5. The method according to claim 4 further comprising the step of:

supplying an atmosphere of gas to treat said slice to modify physical properties thereof.

6. The method according to claim 2 wherein:

said slice is comprised of silicon, and said gas is comprised of a mixture of silane ($SiH_4$) and hydrogen ($H_2$) to deposit an epitaxial layer of silicon on said slice.

7. The method according to claim 1 wherein said heating step comprises:

placing said workpiece a predetermined distance from one focus of an ellipsoidal reflector having said source of radiant energy at the other focus thereof to defocus the image of the radiant energy source falling thereon so that a more even temperature profile is obtained over a surface of said workpiece.

8. The method according to claim 1 wherein said floating step comprises:

controlling said stream of gas to cool selected portions of the workpiece and compensate for uneven heating of said workpiece.

9. The method according to claim 8 comprising the further step of:

increasing the flow of said stream of gas during the subsequent cooling of the workpiece, to decrease the time required for said subsequent cooling.

10. A method of heat treating a slice of semiconductor material to randomly distribute impurities previously diffused therein comprising the steps of:

supporting said slice by flotation on a layer of gas; and heating said slice with energy from a radiant energy source, and thereafter cooling said slice, the flotation of said slice upon said layer of fluid thermally insulating the slice from external thermally conductive bodies so that rapid heating and rapid quenching of said slice is obtained, thereby randomly distributing the diffused impurities in said slice.

11. The method according to claim 10 wherein said supporting step comprises:

supplying a stream of pressurized gas to a pressurized fluid pickup device to float said slice out of physical contact with said pickup device, and placing said slice of semiconductor material on said pickup device.

12. The method according to claim 11 wherein said semiconductor material comprises silicon, said impurities comprise gold atoms, and said gas is chemically inert with respect to silicon.

13. The method according to claim 11 comprising the further step of:

cooling said slice with said stream of pressurized gas.

14. The method according to claim 13 wherein said cooling step comprises:

controlling said stream of pressurized gas to cool selected portions of said slice and compensate for uneven heating of said slice by said radiant energy source.

15. The method according to claim 12 wherein said heating step comprises:

positioning said pickup device at one focus of an ellipsoidal reflector having said radiant energy source at the other focus thereof.

16. The method according to claim 12 wherein said heating step comprises:

positioning said pickup device a predetermined distance from one focus of an ellipsoidal reflector having said radiant energy source at the other focus thereof to defocus the image of the radiant energy source falling onto said silicon slice to produce an even temperature profile thereon.

17. The method according to claim 16 comprising the further step of:

cooling selected portions of said slice to compensate for uneven heating of said slice at said one focus.

18. The method according to claim 17 wherein said cooling step comprises:

increasing the rate of flow of the pressurized gas used to float said slice out of contact with said pickup device.

19. The method according to claim 18 comprising the further step of:

maintaining said increased rate of flow, during the subsequent cooling of said slice, to decrease the time required to cool said slice.

20. A method of depositing a uniform epitaxial layer upon at least one surface of a slice of semiconductor material, comprising the steps of:

floating said slice upon a layer of gas; and heating said slice with energy from a radiant energy source in an atmosphere of gas which contains the material to be deposited as said epitaxial layer, the flotation of said slice upon said layer of gas preventing contamination of said slice by external bodies and also thermally insulating said slice from external thermally conductive bodies so that even and controlled heating of said slice is attained.

21. The method according to claim 20 wherein said floating step comprises:

supplying a stream of pressurized gas to a pressurized fluid pickup device to float said slice out of contact with said pickup device, and placing said semiconductor slice on said pressurized fluid pickup device.

22. The method according to claim 20 wherein said gas contains the material to be deposited as said epitaxial layer, said gas impinging on said at least one surface of said slice to deposit said epitaxial layer thereon.

23. The method according to claim 21 wherein said heating step comprises:

positioning said pressurized fluid pickup device at one focus of an ellipsoidal reflector having said radiant energy source at the other focus thereof.

24. The method according to claim 21 wherein said heating step comprises:

positioning said pressurized fluid pickup device a predetermined distance from one focus of an ellipsoidal reflector having said radiant energy source at the other focus thereof to defocus the image of the radiant energy source falling on said slice to produce an even temperature profile over a surface of said slice.

25. The method according to claim 24 wherein said semiconductor material comprises silicon and said gas comprises silane.

26. The method according to claim 23 comprising the further step of adjusting the rate of flow of said pressurized gas to compensate for uneven heating of said semiconductor slice.

27. A method of diffusing impurities into a slice of semiconductor material, comprising the steps of:

floating said slice upon a layer of gas; and heating said slice with energy from a radiant energy source, in an atmosphere of impurity-containing gas, the flotation of said slice upon said layer of gas preventing contamination of said slice by external bodies and also thermally insulating said slice from external thermally conductive bodies so that even and controlled heating of said slice is attained.

28. The method according to claim 27 wherein said floating step comprises:

supplying a stream of pressurized gas to a pressurized fluid pickup device to float said slice out of contact with said pickup device, and placing said semiconductor slice on said pressurized fluid pickup device.

29. The method according to claim 28 wherein said pressurized gas comprises the impurity-containing gas.

30. The method according to claim 29 wherein said heating step comprises:

placing said pressurized fluid pickup device at one focus of an ellipsoidal reflector having said radiant energy source at the other focus thereof.

31. The method according to claim 29 wherein said heating step comprises:

placing said pressurized fluid pickup device a predetermined distance from one focus of an ellipsoidal reflector having said radiant energy source at the other focus thereof to defocus the image of the radiant energy source falling on said slice so that an even temperature profile is obtained over a surface of said slice.

32. The method according to claim 31 comprising the further step of:

cooling said slice with said stream of pressurized gas.

33. The method according to claim 32 wherein said cooling step comprises increasing the rate of flow of said impurity containing gas to compensate for uneven heating of said slice.

* * * * *